US011614652B2

(12) United States Patent
Nakamura et al.

(10) Patent No.: US 11,614,652 B2
(45) Date of Patent: Mar. 28, 2023

(54) DISPLAY DEVICE

(71) Applicant: JAPAN DISPLAY INC., Tokyo (JP)

(72) Inventors: Tenfu Nakamura, Tokyo (JP); Kojiro Ikeda, Tokyo (JP); Kentaro Okuyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/505,272

(22) Filed: Oct. 19, 2021

(65) Prior Publication Data
US 2022/0035190 A1 Feb. 3, 2022

Related U.S. Application Data

(63) Continuation of application No. PCT/JP2020/001597, filed on Jan. 17, 2020.

(30) Foreign Application Priority Data

Apr. 19, 2019 (JP) .............................. JP2019-080235

(51) Int. Cl.
*G02F 1/1334* (2006.01)
*G02F 1/1343* (2006.01)
*G02F 1/13357* (2006.01)

(52) U.S. Cl.
CPC ........ *G02F 1/13345* (2021.01); *G02F 1/1334* (2013.01); *G02F 1/1343* (2013.01); *G02F 1/133615* (2013.01)

(58) Field of Classification Search
CPC ............... G02F 1/13345; G02F 1/1334; G02F 1/133615; G02F 1/133616
See application file for complete search history.

(56) References Cited

U.S. PATENT DOCUMENTS

2011/0169877 A1* 7/2011 Ishida .................. G02F 1/1334
345/102
2011/0249221 A1 10/2011 Uchida et al.
2016/0163271 A1* 6/2016 Sakaigawa ........... G09G 3/3406
345/694

(Continued)

FOREIGN PATENT DOCUMENTS

JP 2012151081 A 9/2012
JP 2017156491 A 9/2017

(Continued)

OTHER PUBLICATIONS

International Search Report in Application No. PCT/JP2020/001597, dated Mar. 17, 2020.

*Primary Examiner* — Jia X Pan
(74) *Attorney, Agent, or Firm* — K&L Gates LLP

(57) ABSTRACT

According to one embodiment, a display device comprises substrates, a liquid crystal layer containing stringy polymers, a display area with first and second pixels and a light source. In a spatial frequency spectrum obtained by performing FT on a pattern of the polymers which overlap the pixels with respect to first and second frequency components, when an outline in a plane defined by the components in an area having a value of 75% or more of the maximum value is defined as an evaluation circle, and a value obtained by dividing a length of a major axis of the circle by that of a minor axis is defined as an evaluation value, the evaluation value of the first pixel is greater than that of the second pixel.

20 Claims, 13 Drawing Sheets

(56) References Cited

U.S. PATENT DOCUMENTS

| 2017/0256210 | A1* | 9/2017 | Kato | G02F 1/137 |
| 2018/0024403 | A1* | 1/2018 | Yata | G02F 1/133615 |
| | | | | 349/68 |
| 2018/0211630 | A1* | 7/2018 | Kato | G02F 1/1345 |
| 2018/0330681 | A1* | 11/2018 | Kurokawa | G02F 1/1339 |

FOREIGN PATENT DOCUMENTS

| JP | 2018013714 A | 1/2018 |
| WO | 2010035562 A1 | 4/2010 |

\* cited by examiner

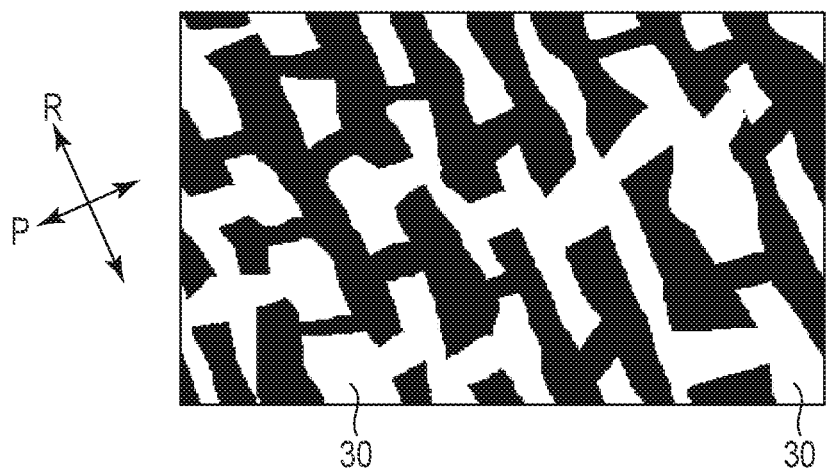
F I G. 6A
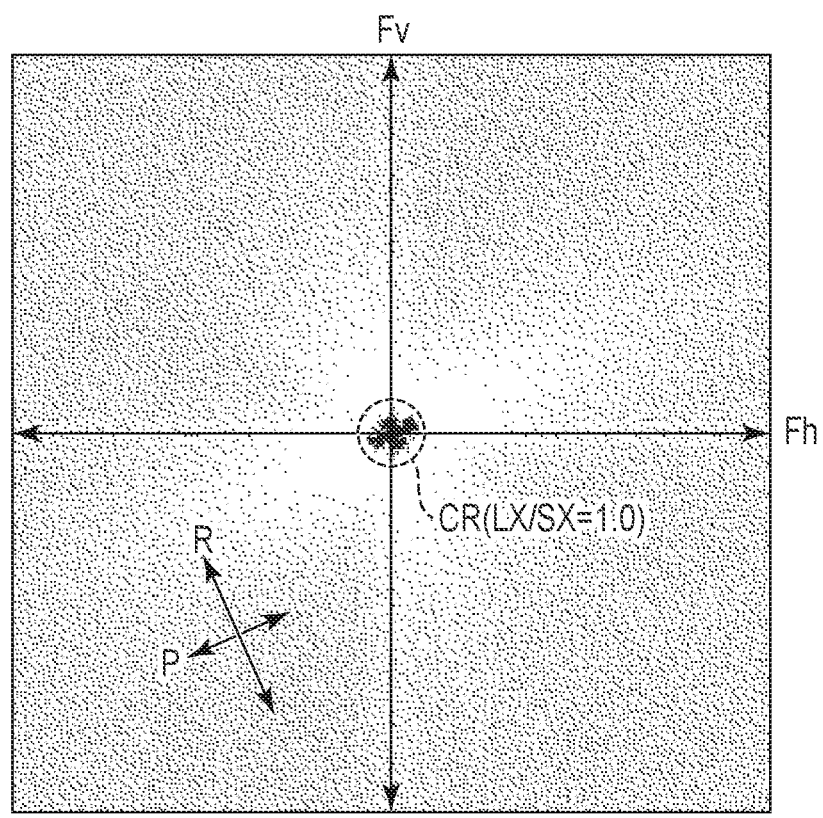
F I G. 6B

DISPLAY DEVICE

CROSS-REFERENCE TO RELATED APPLICATIONS

This application is a Continuation Application of PCT Application No. PCT/JP2020/001597 filed Jan. 17, 2020 and based upon and claiming the benefit of priority from Japanese Patent Application No. 2019-080235, filed Apr. 19, 2019, the entire contents of all of which are incorporated herein by reference.

FIELD

Embodiments described herein relate generally to a display device.

BACKGROUND

A display device comprising a light source, a pair of substrates including pixel electrodes and common electrodes, a polymer-dispersed liquid crystal layer disposed between the substrates and a light source that irradiates light to the liquid crystal layer is conventionally known. For example, the polymer-dispersed liquid crystal layer contains stringy polymers and liquid crystal molecules. In a display device with a polymer-dispersed liquid crystal layer, the degree of scattering of light from the light source can be controlled for each pixel by the voltage between the pixel electrode and the common electrode.

When the above-described light source is disposed to irradiate light on a side surface of at least one of a pair of substrates, non-uniformity in luminance occurs in the display surface. That is, when pixels close to the light source and pixels remote from the light source are all in a similar scattered state, the pixels far from the light source can exhibit a luminance lower than that of the pixels close to the light source.

SUMMARY

The present disclosure relates generally to a display device.

According to one embodiment, a display device comprises substrates, a liquid crystal layer containing stringy polymers, a display area with first and second pixels and a light source. In a spatial frequency spectrum obtained by performing FT on a pattern of the polymers which overlap the pixels with respect to first and second frequency components, when an outline in a plane defined by the components in an area having a value of 75% or more of the maximum value is defined as an evaluation circle, and a value obtained by dividing a length of a major axis of the circle by that of a minor axis is defined as an evaluation value, the evaluation value of the first pixel is greater than that of the second pixel.

BRIEF DESCRIPTION OF THE DRAWINGS

FIG. 6A is a plan view of a pattern of polymers contained in the liquid crystal layer.

FIG. 6B is a diagram illustrating a spatial frequency spectrum obtained by subjecting the pattern in FIG. 6A to fast Fourier transformation.

DETAILED DESCRIPTION

Figure 1:
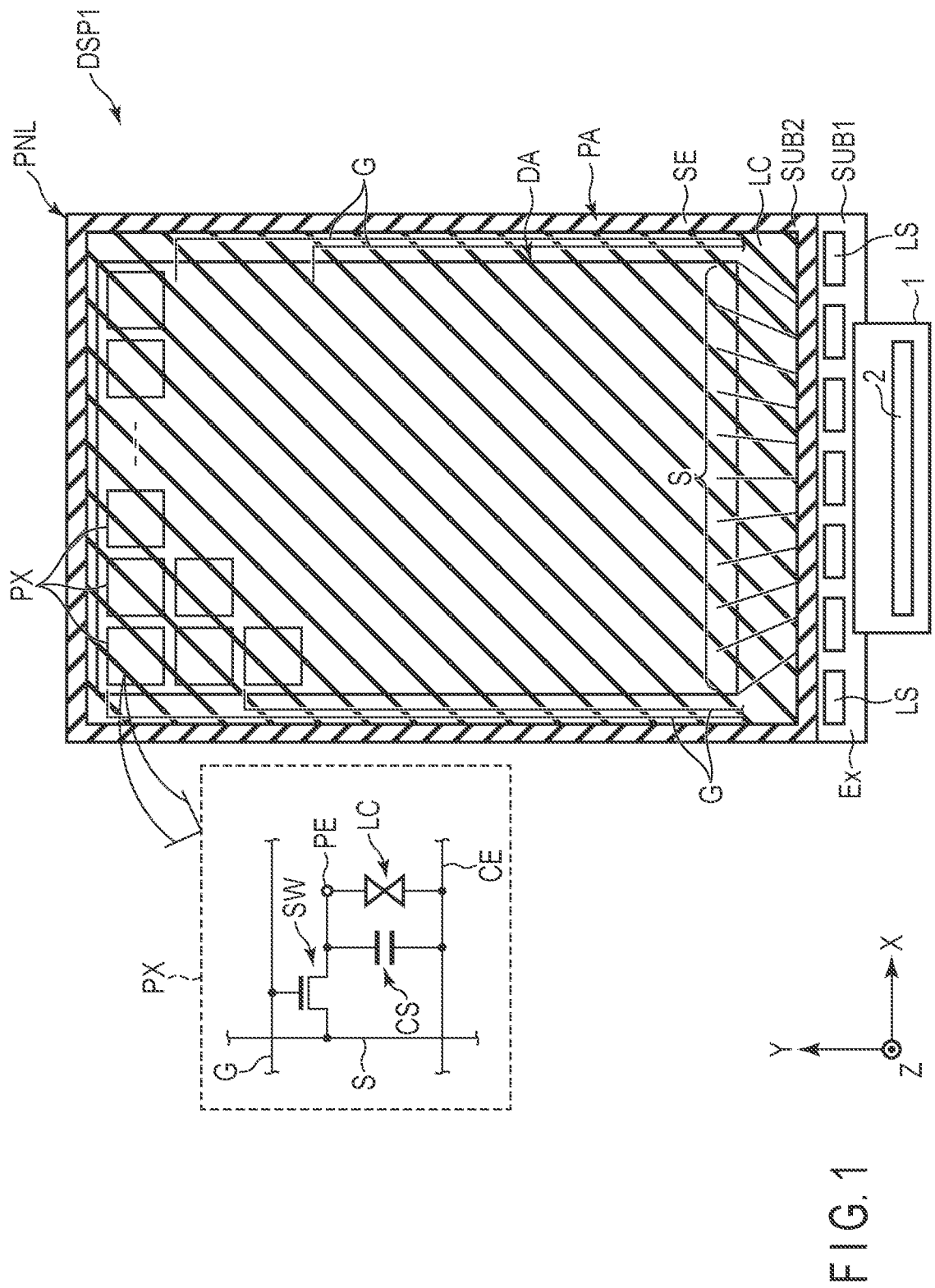
FIG. 1 is a plan view schematically showing a configuration of a display device in the first embodiment.

In general, according to one embodiment, a display device comprises a first substrate, a second substrate opposing the first substrate, a liquid crystal layer disposed between the first substrate and the second substrate and containing stringy polymers and liquid crystal molecules, a display area containing a plurality of pixels and a light source that irradiates light onto a side surface of the first substrate or the second substrate. The plurality of pixels include a first pixel and a second pixel closer to the side surface than the first pixel. In a spatial frequency spectrum obtained by performing a two-dimensional Fourier transformation on a pattern of the stringy polymers which overlap the pixels in a plan view with respect to a first frequency component and a second frequency component, when an outline in a plane defined by the first frequency component and the second frequency component in an area having a value of 75% or more of the maximum value in the spectrum is defined as an evaluation circle, and a value obtained by dividing a length of a major axis of the evaluation circle by a length of a minor axis of the evaluation circle is defined as an evaluation value, the evaluation value of the stringy polymers overlapping the first pixel is greater than the evaluation value of the stringy polymers overlapping the second pixel.

According to another embodiment, a display device comprises a first substrate, a second substrate opposing the first substrate, a liquid crystal layer disposed between the first substrate and the second substrate and containing stringy polymers and liquid crystal molecules, a display area containing a plurality of pixels and a first light source that irradiates light onto a first side surface of the first substrate or the second substrate, a second light source that irradiates light onto a second side surface of the first substrate or the second substrate, which is on a side opposite to the first side surface. The plurality of pixels include a first pixel, a second pixel closer to the first side surface than the first pixel and a third pixel closer to the second side surface than the first pixel. In a spatial frequency spectrum obtained by performing a two-dimensional Fourier transformation on a pattern of the stringy polymers which overlap the pixels in a plan view with respect to a first frequency component and a second frequency component, when an outline in a plane defined by the first frequency component and the second frequency component in an area having a value of 75% or more of the maximum value in the spectrum is defined as an evaluation circle, and a value obtained by dividing a length of a major axis of the evaluation circle by a length of a minor axis of the evaluation circle is defined as an evaluation value, the evaluation value of the stringy polymers overlapping the first pixel is greater than the evaluation values of the stringy polymers overlapping the second pixel and the third pixel.

With to these configurations, non-uniformity in luminance can be suppressed in display devices comprising a polymer-dispersed liquid crystal layer.

Embodiments will be described hereinafter with reference to the accompanying drawings.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. In the drawings, for the same or similar elements that are arranged consecutively, reference signs may be omitted. Besides, in the specification and drawings, the same elements as those described in connection with preceding drawings or those exhibiting similar functions are denoted by like reference numerals, and a detailed description thereof is omitted unless otherwise necessary.

First Embodiment

FIG. 1 is a plan view schematically showing a configuration of a display device DSP1 in the first embodiment. In this embodiment, a first direction X, a second direction Y and a third direction Z are orthogonal to each other, but they may intersect at an angle other than 90 degrees. The first direction X and the second direction Y correspond to the directions parallel to a main surface of a substrate that constitutes the display device DSP1. The third direction Z is equivalent to a thickness direction of the display device DSP1. In this embodiment, viewing an X-Y plane defined by the first direction X and the second direction Y is referred to as planar view.

This embodiment discloses, as an example of the display device DSP1, a liquid crystal display device to which a polymer-dispersed liquid crystal (PDLC) is applied. The display device DSP1 comprises a display panel PNL, a wiring substrate 1, an IC chip 2 (drive circuit) and a plurality of light sources LS.

The display panel PNL comprises a first substrate SUB1 (array substrate), a second substrate SUB2 (counter-substrate), a liquid crystal layer LC and a sealant SE. The first substrate SUB1 and the second substrate SUB2 are each formed into a flat plate shape parallel to the X-Y plane, so as to oppose each other along the third direction Z. The sealant SE is formed in a loop shape, for example, and adheres the first substrate SUB1 and the second substrate SUB2 to each other. The liquid crystal layer LC is disposed between the first substrate SUB1 and the second substrate SUB2, and is sealed by the sealant SE.

The display panel PNL includes a display area DA which displays images and a frame-shaped peripheral area PA which surrounds the display area DA. The sealant SE is placed on the peripheral area PA. The display area DA comprises a plurality of pixels PX arranged in a matrix along the first and second directions X and Y.

As shown in an enlarged view in FIG. 1, each pixel PX comprises a switching element SW, a pixel electrode PE and a common electrode CE. The switching element SW is formed from a thin-film transistor (TFT), for example, and is electrically connected to a respective scanning line G and a respective signal line S. The scanning line G is electrically connected to the switching element SW in each of the pixels PX which are aligned along the first direction X. The signal line S is electrically connected to the switching element SW in each of the pixels PX aligned along the second direction Y. The pixel electrode PE is electrically connected to the switching element SW. The common electrode CE is provided in common with a plurality of pixel electrodes PE. The liquid crystal layer LC is driven by an electric field produced between the pixel electrodes PE and the common electrode CE. The capacitance CS is formed, for example, between an electrode having the same potential as that of the common electrode CE and an electrode having the same potential as that of the pixel electrode PE.

As will be describe later, the scanning lines G, the signal lines S, the switching devices SW and the pixel electrodes PE are provided on the first substrate SUB1, and the common electrodes CE are provided on the second substrate SUB2. The scanning lines G extend to the peripheral area PA and are electrically connected to the wiring substrate 1 or the IC chip 2. The signal lines S extend to the peripheral area PA and are electrically connected to the wiring substrate 1 or the IC chip 2.

The wiring substrate 1 is electrically connected to terminals disposed in an extended portion Ex of the first substrate SUB1. The extended portion Ex is equivalent to the portion of the first substrate SUB1, which does not oppose the second substrate SUB2. For example, the wiring substrate 1 is a flexible printed circuit board, and the IC chip 2 is mounted on the wiring substrate 1. The IC chip 2 incorporates, for example, a display driver that outputs signals necessary for image display. Note that the IC chip 2 may be mounted on the extended portion Ex.

The light sources LS are superimposed on the extended portion Ex. The light sources are arranged to be spaced apart from each other along the first direction X. Each light source LS includes, for example, a light-emitting element that emits red light, a light-emitting element that emits green light and a light-emitting element that emits blue light. As the light-emitting elements, for example, light-emitting diodes (LEDs) can be employed, but the members are not limited to those of the example.

Figure 2:
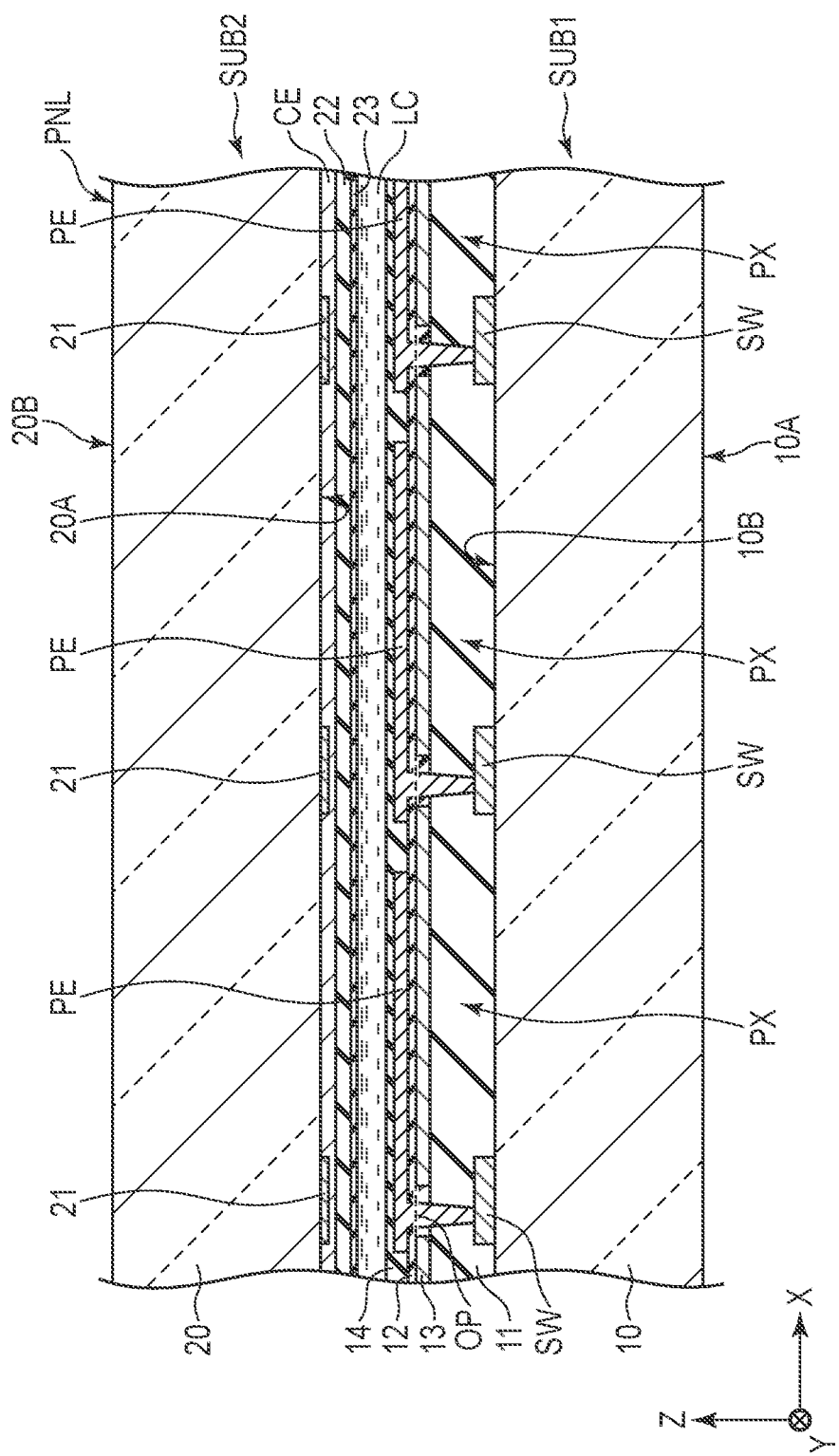
FIG. 2 is a cross-sectional view showing an example of a configuration that can be applied to a display panel of the above-described display device.

FIG. 2 is a cross-sectional view showing an example of a configuration that can be applied to the display panel PNL shown in FIG. 1. The first substrate SUB1 comprises a first transparent base 10, insulating films 11 and 12, a capacitive electrode 13, a first alignment film 14, a switching element SW and a pixel electrodes PE. The first transparent base 10 includes a first surface 10A and a second surface 10B on an opposite side to the first surface 10A.

The switching device SW is disposed on a second surface 10B side. The insulating film 11 covers the switching element SW. In FIG. 2, the switching element SW is illustrated in a simplified manner, but in reality, the switching element SW includes a semiconductor layer and various electrodes. Note that the scanning lines G and the signal lines S shown in FIG. 1 are disposed between the first transparent base 10 and the insulating film 11, but are omitted from the illustration of FIG. 2. The capacitive electrode 13 is disposed between the insulating films 11 and 12. The pixel electrodes PE are each disposed between the insulating film 12 and the first alignment film 14 for each pixel PX. The pixel electrode PE is electrically connected to the switching device SW through an opening OP of the capacitive electrode 13. The pixel electrode PE opposes the capacitive electrode 13 to form the capacitance CS described above. The first alignment film 14 covers the pixel electrode PE.

The second substrate SUB2 comprises a second transparent base 20, light-shielding layers 21, an overcoat layer 22, a second alignment film 23 and a common electrode CE. The second transparent base 20 includes a first surface 20A opposing the first substrate SUB1 and a second surface 20B on an opposite side to the first surface 20A.

The light-shielding layers 21 and the common electrode CE are disposed on a first surface 20A side. For example, the light-shielding layers 21 oppose the switching device SW, the respective scanning line G and the respective signal line S. The common electrode CE is disposed over a plurality of pixels PX and opposes a plurality of pixel electrodes PE along the third direction Z. Further, the common electrode CE covers the light-shielding layers 21. The common electrode CE is at the same potential as that of the capacitive electrode 13. The overcoat layer 22 covers the common electrode CE. The second alignment film 23 covers the overcoat layer 22. The liquid crystal layer LC is disposed between the first alignment film 14 and the second alignment film 23 and is in contact with the alignment films 14 and 23.

The first transparent base 10 and the second transparent base 20 are insulating substrates such as of glass or plastic, for example. The insulating film 11 is formed of, for example, a transparent insulating material such as silicon oxide, silicon nitride, silicon oxynitride or acrylic resin. For example, the insulating film 11 includes an inorganic insulating film and an organic insulating film. The insulating film 12 is, for example, an inorganic insulating film such as silicon nitride. The capacitive electrode 13, the pixel electrodes PE and the common electrode CE are, for example, transparent electrodes each formed of a transparent conductive material such as indium tin oxide (ITO) and indium zinc oxide (IZO). The first alignment film 14 and the second alignment film 23 are horizontal alignment films having an alignment restriction force that is substantially parallel to the X-Y plane. The alignment restriction force may be imparted by rubbing treatment or by photo-alignment process.

Note that the configuration of the display panel PNL is not limited to that of the example shown in FIGS. 1 and 2. For example, the first substrate SUB1 may not comprise a capacitive electrode 13. Further, the second substrate SUB2 may not comprise a light-shielding layer 21.

Figure 3:
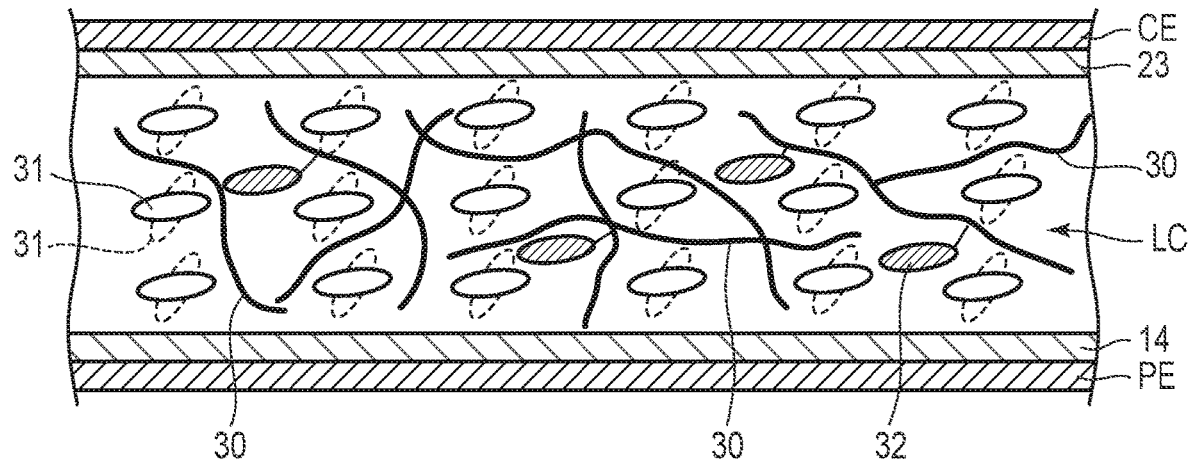
FIG. 3 is a schematic cross-sectional view for illustrating a configuration of a liquid crystal layer of the display device.

FIG. 3 is a cross-sectional view schematically showing the display panel PNL, which illustrates a configuration example of the liquid crystal layer LC. In this embodiment, the liquid crystal layer LC contains stringy (network-like) polymers 30 and liquid crystal molecules 31. For example, the polymers 30 are liquid crystalline polymers. The liquid crystal molecules 31 are dispersed in gaps of the polymers 30. As shown in FIG. 3, there may be monomers 32 linked to the polymers 30.

Such a liquid crystal layer LC is obtained, for example, by injecting liquid crystal monomers between the first alignment film 14 and the second alignment film 23 and irradiating ultraviolet light to the liquid crystal monomers which are aligned in a predetermined direction by the alignment restriction force of the alignment films 14 and 23. In other words, the liquid crystal monomers are polymerized by UV light, thus forming the stringy polymers 30.

Each of the polymers 30 and the liquid crystal molecules 31 has optical anisotropy or refractive index anisotropy. The responsiveness of the polymers 30 to electric fields is lower than that of the liquid crystal molecules 31 to electric fields. For example, the alignment direction of the polymer 30 does not substantially vary regardless of the electric field between the pixel electrodes PE and the common electrode CE. On the other hand, the alignment direction of the liquid crystal molecules 31 varies in response to the electric field.

In FIG. 3, the liquid crystal molecules 31, indicated by solid lines, represent an alignment state of the case where there is no potential difference between the pixel electrodes PE and the common electrode CE (when no electric field is produced). The liquid crystal molecules 31, indicated by dashed lines, represent an alignment state of the case where there is a potential difference between the pixel electrodes PE and the common electrode CE (when an electric field is produced).

When there is no electric field acting on the liquid crystal layer LC or the electric field is extremely weak, the optical axes of the polymers 30 and the liquid crystal molecules 31 are all substantially parallel to each other. Therefore, the light entering the liquid crystal layer LC is transmitted through the liquid crystal layer LC without substantially being scattered therein. Such a state will be hereinafter referred to as a transparent state. The voltage at the pixel electrodes PE to realize the transparent state is called a transparent voltage. The transparent voltage may be the same as a common voltage applied to the common electrode CE, or may be a voltage slightly different from the common voltage.

On the other hand, when a sufficient electric field is acting on the liquid crystal layer LC, the optical axes of the polymers 30 and the liquid crystal molecules 31 cross each other, respectively. Therefore, the light entering the liquid crystal layer LC is scattered within the liquid crystal layer LC. Such a state will be hereinafter referred to as a scattered state. Further, the voltage of the pixel electrodes PE, which realizes the scattered state is called a scattering voltage. The scattering voltage is a voltage such that the potential difference with the common electrode CE is greater than that of the transparent voltage.

Figure 4:
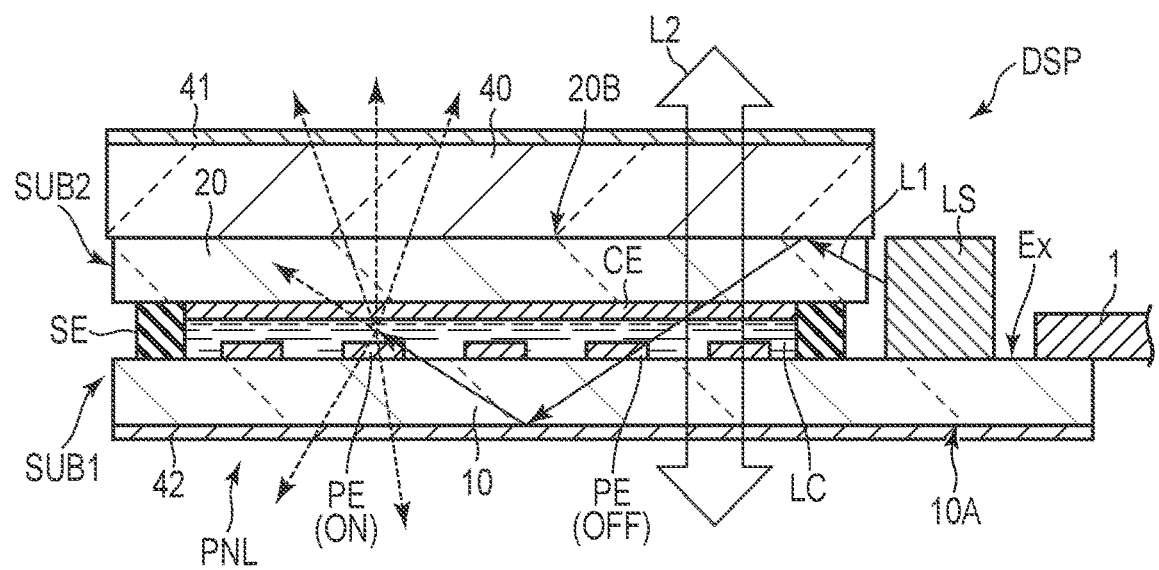
FIG. 4 is a schematic cross-sectional view showing a configuration that can be applied to the display device.

FIG. 4 is a schematic cross-sectional view showing a configuration example that can be applied to the display device DSP1. The light sources LS are located in the extended portion Ex so as to oppose a side surface of the second substrate SUB2. Note that the light sources LS may be placed in a location other than the extended portion Ex.

Further, the light sources LS may oppose a side surface of the first substrate SUB1, or may oppose side surfaces of both the first substrate SUB1 and the second substrate SUB2.

As shown in FIG. 4, light L1 emitted by the light sources LS is irradiated onto the side surface of the second substrate SUB2. The light L1 that enters the display panel PNL from the side surface propagates inside the display panel PNL. In the vicinity of a pixel electrode PE to which the transparent voltage is applied, (which is indicated by OFF in FIG. 4), the light L1 is not substantially scattered by the liquid crystal layer LC. Therefore, the light L1 does not substantially leak out of the first substrate SUB1 and the second substrate SUB2.

On the other hand, in the vicinity of a pixel electrode PE to which the scattering voltage is applied (which is indicated by ON in FIG. 4), the light L1 is scattered by the liquid crystal layer LC. The scattered light is output from the first substrate SUB1 and the second substrate SUB2 and is visually recognized as a display image. Here, by regulating the scattering voltage in steps within a predetermined range, it is also possible to achieve expression of gradation in the scattering degree (luminance).

Note that in the vicinity of the pixel electrode PE to which the transparent voltage is applied, external light L2 entering the first substrate SUB1 or the second substrate SUB2 is transmitted through the substrates without being substantially scattered. In other words, when the display panel PNL is viewed from the second substrate SUB2 side, the background of the first substrate SUB1 side can be visually recognized, whereas when the display panel PNL is viewed from the first substrate SUB1 side, the background of the second substrate SUB2 side can be visually recognized.

The display device DSP1 with such a configuration as described above can be driven, for example, by a field sequential method. In this method, one frame period includes multiple subframe periods (fields). For example, if the light sources LS include red, green and blue light-emitting elements, one frame period includes red, green and blue sub-frame periods.

In the red subframe period, the red light-emitting element is turned on and the voltage corresponding to the red image data is applied to each pixel electrode PE. Thus, a red image is displayed. Similarly, in the green and blue subframe periods, the green and blue light-emitting elements are turned on and the voltages corresponding to the green and blue image data, respectively, are applied to each pixel electrode PE. Thus, green and blue images are displayed. The red, green, and blue images displayed in a time division manner are synthesized with each other to be seen as a multi-color image by the observer.

Note that the liquid crystal layer LC may be configured such that it is placed in a scattered state when a voltage equivalent to the common voltage is applied to the pixel electrode PE, whereas it is placed in a transparent state when a voltage sufficiently different from the common voltage is applied to the pixel electrode PE. Further, the display device DSP1 may as well be configured to display monochromatic images.

As shown in FIG. 4, a cover member 40 formed, for example, of glass may be disposed on the upper surface (second surface 20B) of the second substrate SUB2. In this case, the light sources LS may oppose or may not oppose a side surface of the cover member 40. The light from the light sources LS may propagate inside the cover member 40.

Further, a first optical function layer 41 may be provided on an upper surface of the cover member 40 and a second optical function layer 42 may be provided on the lower surface (first surface 10A) of the first substrate SUB1. As the optical functional layers 41 and 42, for example, an ultraviolet light-absorbing layer or an anti-reflective layer may be applied. When an ultraviolet light-absorbing layer is applied, degradation of the liquid crystal layer LC, which may be caused by ultraviolet light can be suppressed. When an anti-reflective layer is applied, the reflection of external light can be suppressed, and thus the visibility of images or backgrounds can be improved. The optical function layers 41 and 42 may each include both an ultraviolet light-absorbing layer and an anti-reflective layer.

Figure 5:
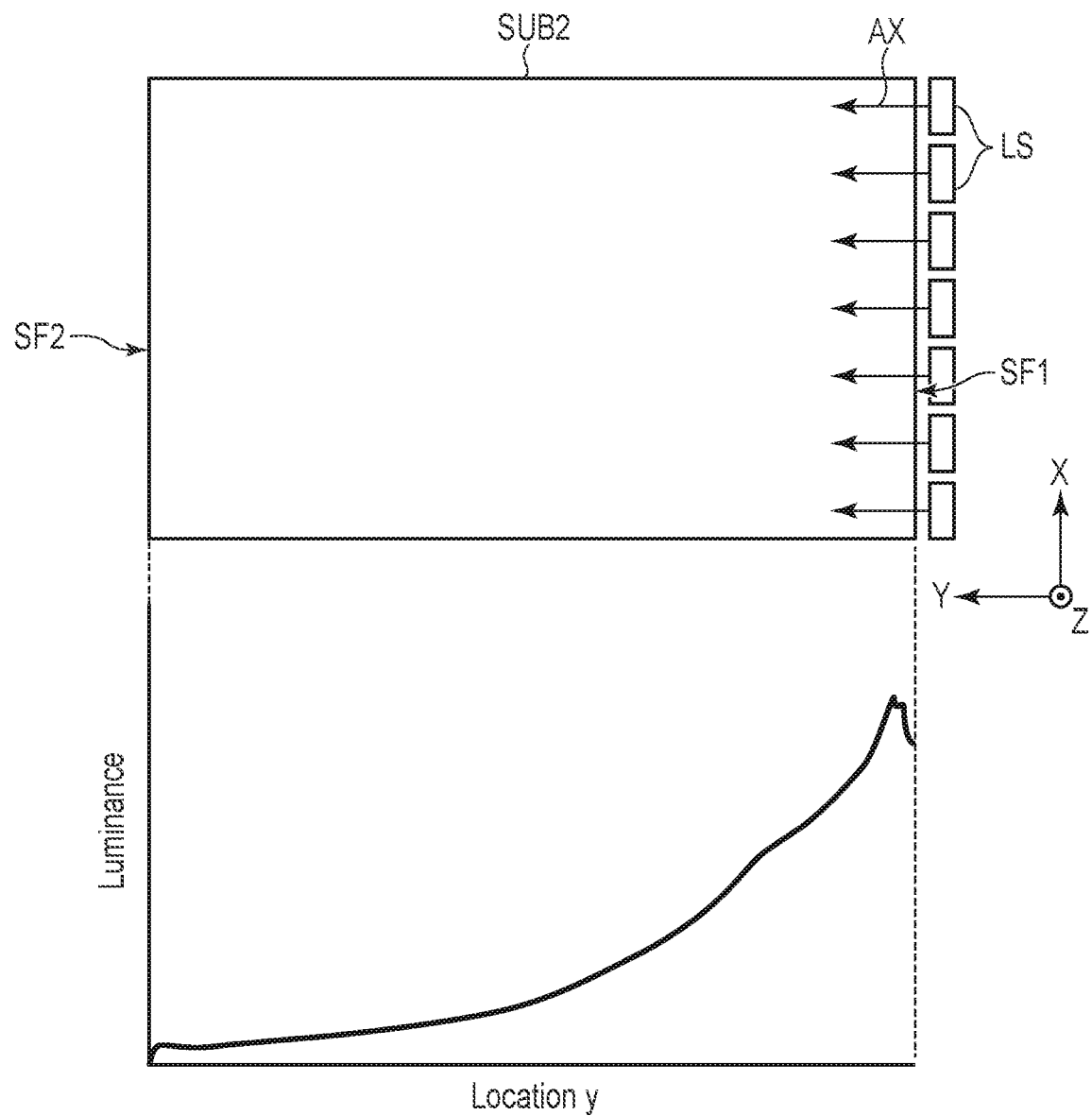
FIG. 5 is a diagram for illustrating luminance distribution of a second substrate of the display device.

FIG. 5 is a diagram illustrating the luminance distribution in the second substrate SUB2. FIG. 5 includes an upper part which shows a plan view schematically showing the second substrate SUB2 and the light sources LS, and a lower part which shows the luminance distribution according to a location y in the second direction Y.

The second substrate SUB2 includes a first side surface SF1 and a second side surface SF2 on a side opposite to the first side surface SF1. Each light source LS opposes the first side surface SF1. The light sources LS each irradiate diffusing light around optical axis AX at its center, onto the first side surface SF1. The optical axes AX are parallel to the second direction Y, for example.

The luminance distribution in FIG. 5 corresponds to the case where a predetermined scattering voltage is applied to the pixel electrodes PE of all pixels PX. Note, as will be described later, that in this embodiment, the polymers 30 overlapping the pixels PX differ in shape from one to another, but the luminance distribution provided in FIG. 5 is of a comparative example assuming that the polymers 30 overlapping the pixels PX are in a uniform shape.

The light from the light sources LS becomes weaker as the location becomes closer to the second side surface SF2 due to absorption by the scanning lines G, the signal lines S, the light-shielding layer 21, the insulating films 11 and 12 and the like, and scattering by pixels PX located near the first side surface SF1. Thus, the luminance of the pixels PX as well lowers as the location becomes closer to the second side surface SF2, as shown in the figure. When such non-uniformity in luminance occurs, the display quality of the display device DSP1 is degraded.

The inventors has found that the degree of scattering of the pixels PX depends on the shapes of the polymers 30. In other words, it is possible to improve the non-uniformity in luminance by optimizing the shapes of the polymers 30 according to the distance from the first side surface SF1 where the light enters. The shapes of the polymers 30 can be analyzed, for example, by performing a two-dimensional Fourier transformation (for example, fast Fourier transformation: FFT) on the pattern of the polymers 30 in planar view.

The two-dimensional Fourier transform is a process that transforms a spatial domain consisting of pixel values which constitute the pattern into a spatial frequency domain. To explain, a pattern of the polymers in a plan view contains frequency components of horizontal and vertical directions. In the two-dimensional Fourier transformation, the pattern is Fourier-transformed in the horizontal and vertical directions, and based on the results, a frequency spectrum which represents the distribution of amplitudes for the frequency components in the horizontal and vertical directions is obtained. The following are examples of some patterns of the polymers 30 and the frequency spectrum obtained by transforming these patterns by the two-dimensional Fourier transformation.

FIGS. 6A to 9A are each an enlarged schematic diagram showing a patterns of the polymers 30 in planar view. In each pattern, the white area corresponds to the polymers 30. FIGS. 6B to 9B each show a spatial frequency spectra obtained by fast Fourier transformation based on magnified images of the polymers 30 taken under a microscope. In FIGS. 6B to 9B, the horizontal axis indicates the first frequency component Fh (horizontal frequency component) and the vertical axis indicates the second frequency component Fv (vertical frequency component). For example, one of the first frequency component Fh and the second frequency component Fv is a frequency component in the first direction X, and the other is the frequency component in the second direction Y. Note that the directions of these frequency components Fh and Fv are not limited to the first direction X and the second direction Y. The point where the axis of the first frequency component Fh intersects with the axis of the second frequency component Fv is expressed by (Fh, Fv)=(0, 0), and the further away from this point, the higher the frequency becomes. The amplitude of each frequency component (Fh, Fv) is represented by shades of color.

For example, the pattern of the polymers 30 can be adjusted by changing, for example, the characteristics of the liquid crystal layer LC before polymerization, the exposure conditions of the UV light during polymerization, or the conditions in the heat treatment after polymerization. By adjusting these appropriately, a desired pattern of the polymers 30 can be realized.

Patterns such as those shown in FIGS. 6A to 9A can be created, for example, by taking a magnified photograph of the polymer 30 under a microscope and binarizing the photograph at a predetermined threshold value. It suffices if the fast Fourier Transform to obtain the spatial frequency spectrum shown in FIGS. 6B to 9B is performed on the pattern of the polymers 30 in the region corresponding to one pixel PX, for example. The size of the region (the size of one pixel PX) is, for example, 200 μm×200 μm or 100 μm×100 μm, but may be smaller or larger.

In each of FIGS. 6A to 9A, an alignment restriction direction R (for example, a rubbing direction to each of the alignment films 14 and 23) in which the alignment restriction force of each alignment film 14 or 23 described above acts and an orthogonal direction P orthogonal to the alignment restriction direction R are indicated by arrows. Directions corresponding to the alignment restriction direction R and the orthogonal direction P in the Fh-Fv plane defined by the frequency components Fh and Fv are also indicated by arrows in FIGS. 6B to 9B.

FIGS. 6B to 9B each show an evaluation circle CR used to quantitatively evaluate the spatial frequency spectrum. FIG. 10 is a diagram illustrating an overview of the evaluation circle CR. In order to determine the evaluation circle CR, first, in the spatial frequency spectrum, the spectrum of 75% or more of the maximum amplitude is plotted in the Fh-Fv plane. Then, a circle obtained by connecting the plots having the highest frequencies (the plots farthest from the origin O) in all directions passing through the origin O of (Fh, Fv)=(0, 0) is defined as the evaluation circle CR. Such an evaluation circle CR is equivalent to the outline of the region where the amplitude is 75% or more of the maximum value in the Fh-Fv plane. The evaluation circle CR may be a regular circle or an ellipse. If the above outline is not an exact regular circle or ellipse, the evaluation circle CR may be an approximation of the outline to a regular circle or ellipse. If the evaluation circle CR is an ellipse, its major axis is defined as LX and its minor axis is defined as SX.

In the pattern shown in FIG. 6A, the polymers 30 are irregularly distributed in substantially all directions. Therefore, the spatial frequency spectrum is isotropic, as shown in FIG. 6B. In this case, the evaluation circle CR is substantially a regular circle.

Figure 7A:
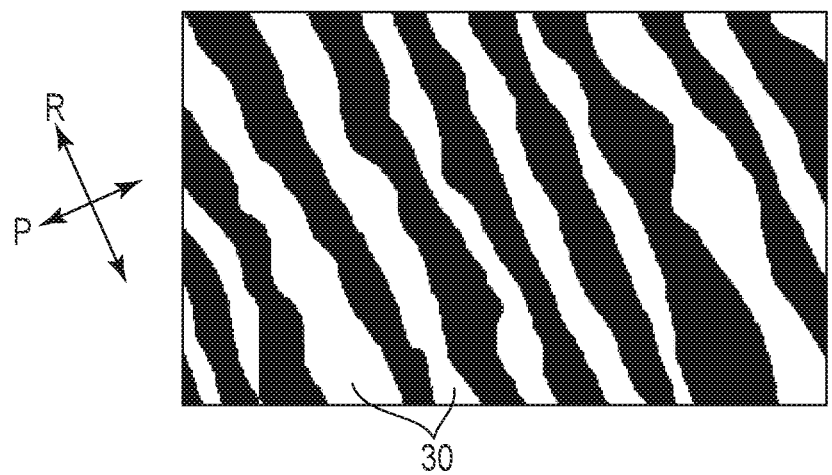
FIG. 7A is a plan view of the pattern of the polymers contained in the liquid crystal layer.
Figure 7B:
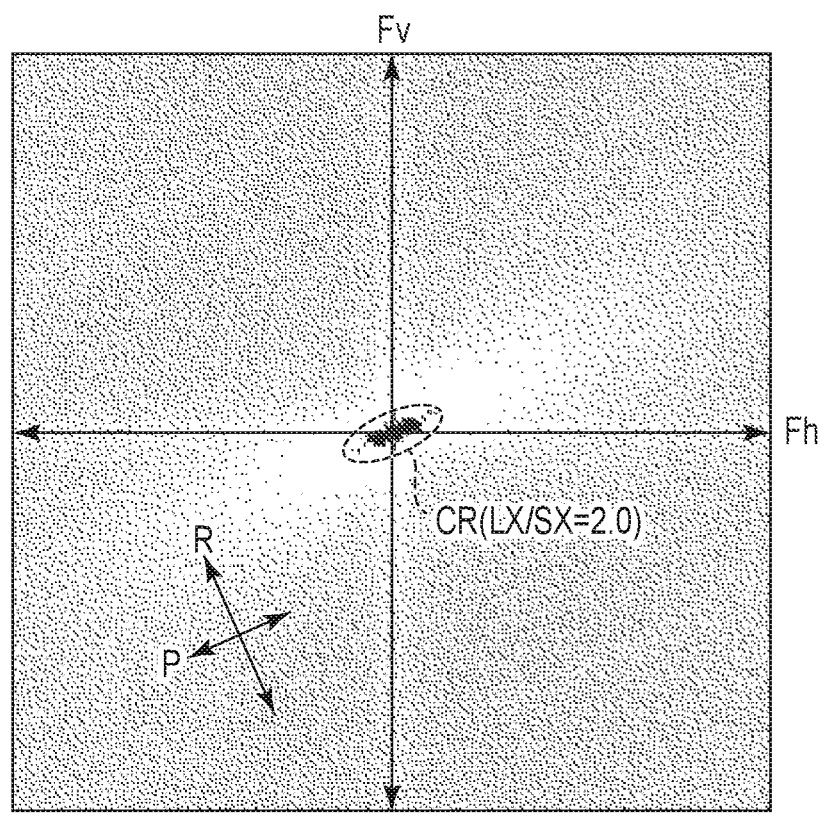
FIG. 7B is a diagram illustrating a spatial frequency spectrum obtained by subjecting the pattern in FIG. 7A to fast Fourier transformation.

In the pattern shown in FIG. 7A, the polymers 30 elongate along the alignment regulation direction R and are aligned along the orthogonal direction P. The spatial frequency spectrum of such a pattern, as shown in FIG. 7B, has a small width of spectrum in the alignment restriction direction R and a large width of spectrum in the orthogonal direction P. Therefore, the evaluation circle CR is elliptical.

Figure 8A:
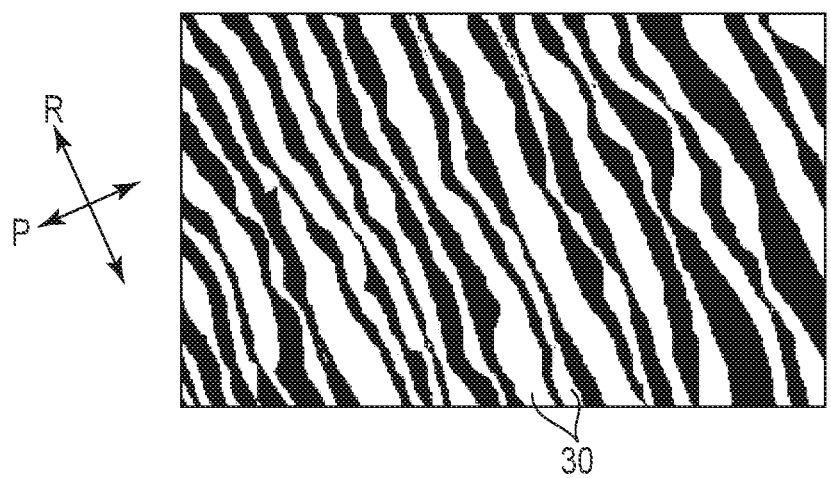
FIG. 8A is a plan view of the pattern of the polymers contained in the liquid crystal layer.
Figure 8B:
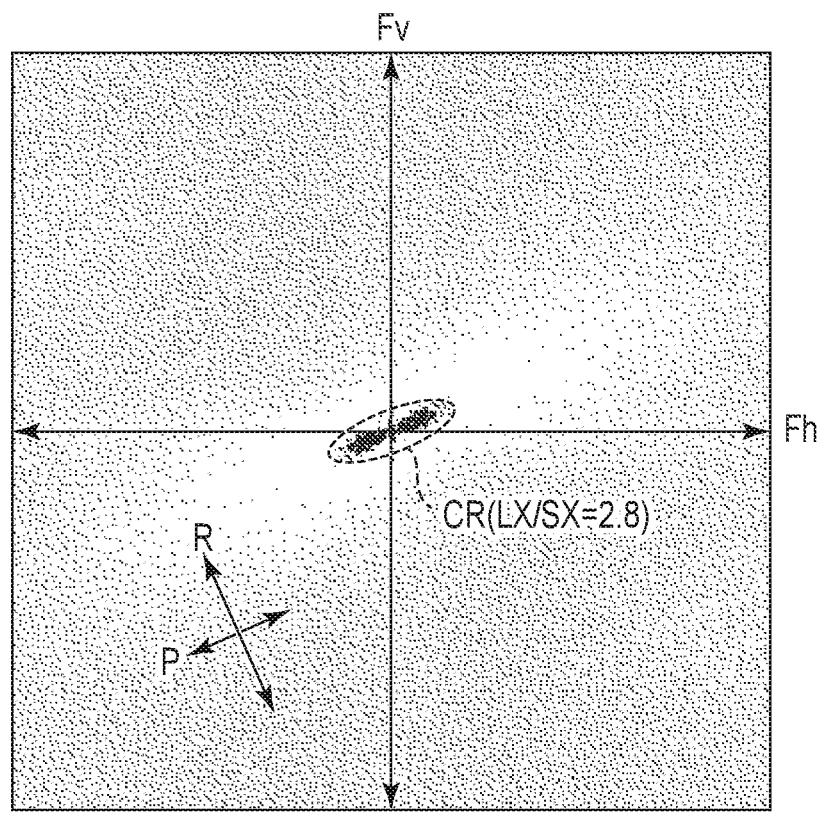
FIG. 8B is a diagram illustrating a spatial frequency spectrum obtained by subjecting the pattern in FIG. 8A to fast Fourier transformation.
Figure 9A:
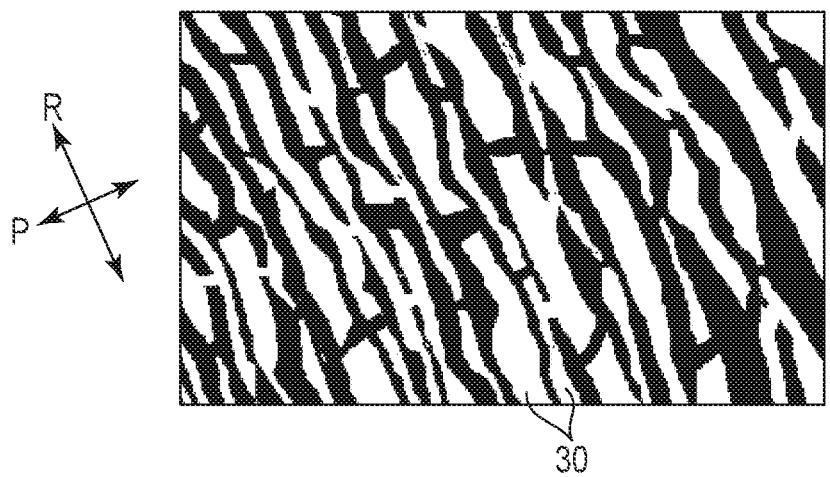
FIG. 9A is a plan view of the pattern of the polymers contained in the liquid crystal layer.
Figure 9B:
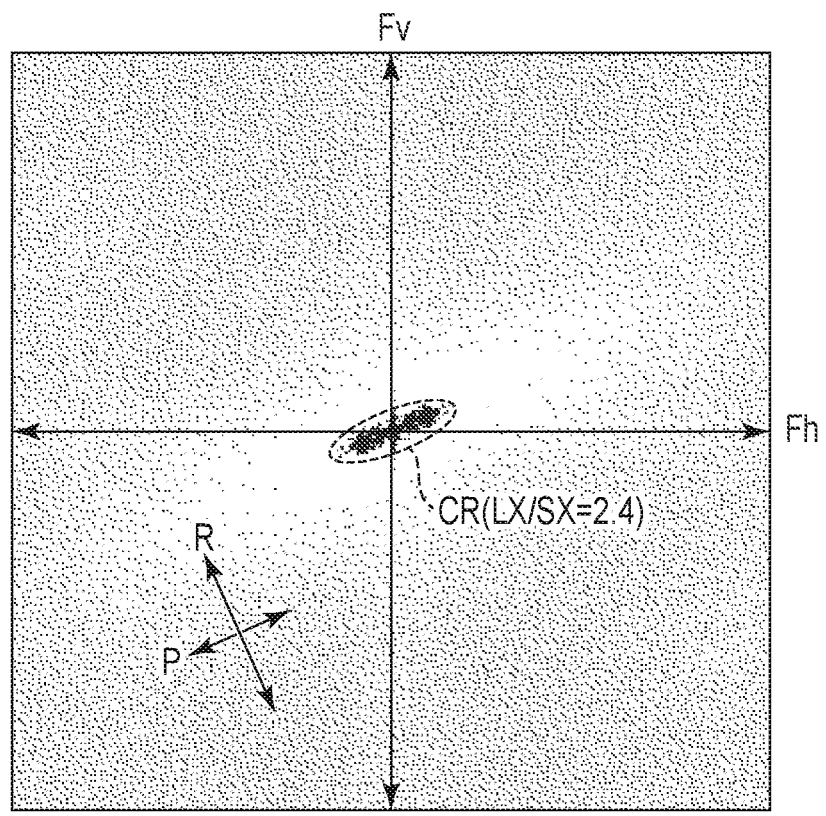
FIG. 9B is a diagram illustrating a spatial frequency spectrum obtained by subjecting the pattern in FIG. 9A to fast Fourier transformation.
Figure 10:
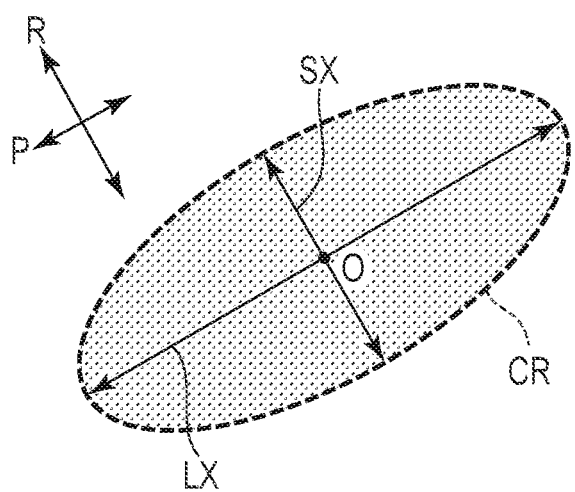
FIG. 10 is an overview of an evaluation circle of the spatial frequency spectrum.

In the patterns shown in FIGS. 8A and 9A, the pitches of the polymers 30 in the orthogonal direction P are less than that of the pattern of FIG. 7A. In this case, the evaluation circle CR is also elliptical, but the width of the spectrum in the orthogonal direction P is larger as shown in FIGS. 8B and 9B; therefore the major axis LX of the evaluation circle CR is longer as compared to that shown in FIG. 7A.

In the patterns shown in FIGS. 8A and 9A, the pitches of the polymers 30 in the orthogonal direction P are equivalent to each other. However, in the pattern shown in FIG. 8A, the polymers 30 elongate continuously in the alignment restriction direction R, whereas in the pattern of FIG. 9A, the polymers 30 elongate intermittently in the alignment restriction direction R. Under these circumstances, the spatial frequency spectrum shown in FIG. 9B has a width greater in the alignment regulation direction R. Therefore, the minor axis SX of the evaluation circle CR in FIG. 9B is greater than that of the evaluation circle CR in FIG. 8B.

Thus, the characteristics of the pattern of polymers 30 in a plan view are expressed in the evaluation circle CR. In this embodiment, the value obtained by dividing the length of the major axis LX in the evaluation circle CR by the length of the minor axis SX, (LX/SX) is used as the evaluation value of the pattern of the polymers 30. For example, the evaluation value of the evaluation circle CR of FIG. 6B is 1.0, that of FIG. 7B is 2.0, that of FIG. 8B is 2.8, and that of FIG. 9B is 2.4.

From the viewpoint of increasing the degree of scattering in the liquid crystal layer LC to which a voltage is applied, it is preferable that the direction in which the stringy polymers 30 elongate and the direction of the optical axis AX (see FIG. 5) of the light emitted by the light sources LS are orthogonal in a plan view. To realize such polymers 30, the alignment restriction direction R of each of the alignment films 14 and 23 should be made parallel to the direction orthogonal to the optical axis AX (the first direction X in this embodiment). If the direction in which the polymers 30 elongate coincides with the direction of the optical axis AX, the direction of the major axis LX corresponds to the direction of the optical axis AX in the spatial frequency spectra shown in FIGS. 7B to 9B.

Figure 11:
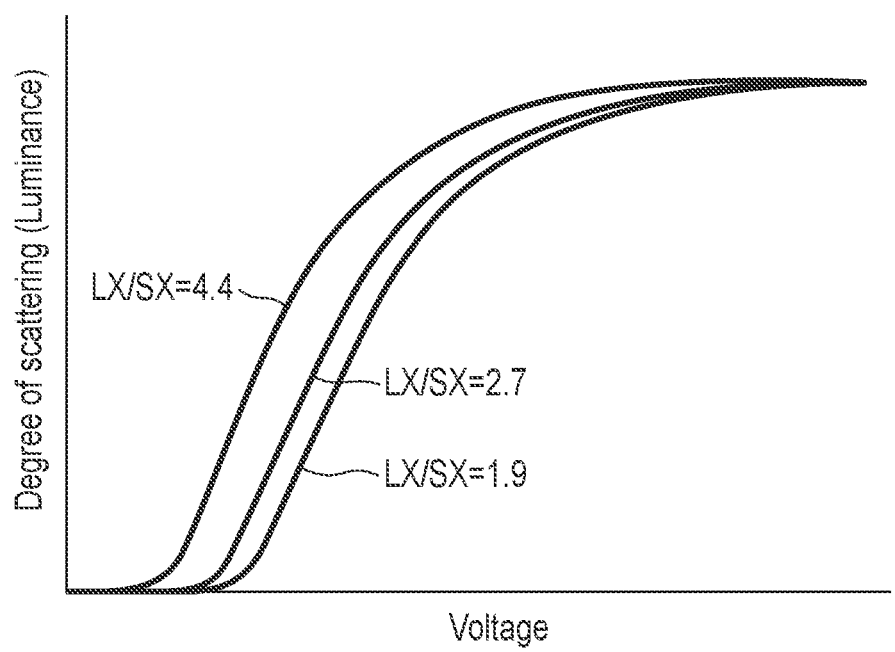
FIG. 11 is a graph showing the relationship between voltage applied to the liquid crystal layer and the degree of scattering (luminance).

Next, the relationship between the evaluation value and the characteristics of the liquid crystal layer LC will be described. FIG. 11 is a graph showing the relationship between the voltage applied to the liquid crystal layer LC and the degree of scattering (luminance) of the liquid crystal layer LC. Here, the curves of the voltage-scattering degree characteristics when the evaluation values (LX/SX) are 1.9, 2.7, and 4.4 are shown.

As can be seen from the three curves, the scattering degree of the liquid crystal layer LC increases as the voltage increases and saturates when the voltage becomes sufficiently high. Comparing the three curves in the region where the scattering degree increases, it can be understood that the scattering degree increases when the evaluation value is large for the same voltage. This is considered to be because, for example, if the pattern of the polymers 30 is irregular as shown in FIG. 6A, the movement of the liquid crystal molecules 31 is inhibited by the polymers 30, whereas if the pattern of the polymers 30 is regular as shown in FIGS. 7A to 9A, the movement of liquid crystal molecules 31 is less affected by the polymers 30.

From the above-provided discussion, the degree of scattering of the liquid crystal layer LC in the X-Y plane can be controlled by adjusting the pattern of the polymers 30 in the liquid crystal layer LC in the X-Y plane. That is, when the change in the scattering degree in the X-Y plane cancels the luminance gradient shown in FIG. 5, the non-uniformity in luminance in the displayed image can be suppressed. For example, a non-uniform pattern of the polymers 30 can be realized by changing the exposure conditions of the ultraviolet light irradiated when forming the liquid crystal layer LC, for example, the amount of exposure, according to the location in the X-Y plane.

Figure 12:
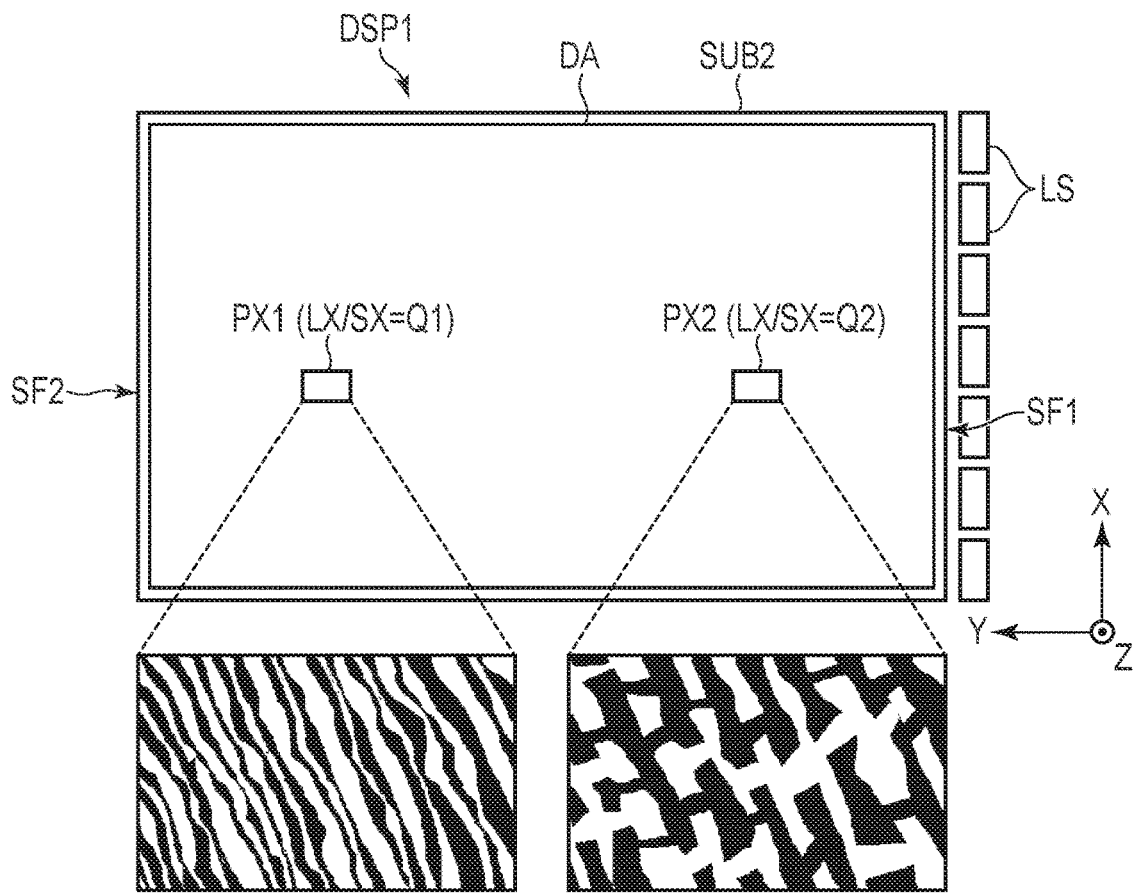
FIG. 12 shows an example of pattern adjustment of the polymers in the first embodiment.

FIG. 12 is a diagram showing an example of the pattern adjustment of the polymers 30. The pixels PX of the display device DSP1 includes a first pixel PX1 and a second pixel PX2. The second pixel PX2 is located closer to the first side surface SF1 than the first pixel PX1. The first side surface SF1 is an incident surface to which diffused light from the light sources LS is irradiated as described above.

The evaluation value (LX/SX) of the polymers 30 superimposed on the first pixel PX1 is Q1, and the evaluation value of the polymers 30 superimposed on the second pixel PX2 is Q2. In this embodiment, the evaluation value Q1 is greater than the evaluation value Q2 (Q1>Q2).

Figure 13:
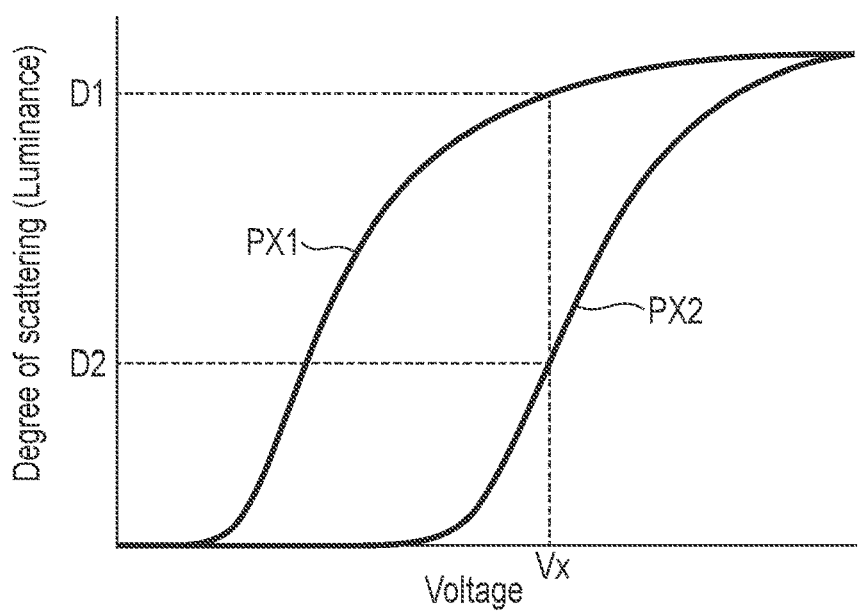
FIG. 13 is a graph showing the relationship between the voltage applied to the liquid crystal layer and the degree of scattering (luminance) in each of the first and second pixels.

FIG. 13 is a graph showing the relationship between the voltage applied to the liquid crystal layer LC and the scattering degree (luminance) of each of the first and second pixels PX1 and PX2. Since the relationship: Q1>Q2 is established, the scattering degree of the first pixel PX1 increases from a lower voltage than that of the second pixel PX2. Therefore, at a predetermined voltage Vx before the scattering degree of each of the pixels PX1 and PX2 is saturated, the scattering degree D1 of the first pixel PX1 is greater than the scattering degree D2 of the second pixel PX2 (D1>D2).

The predetermined voltage Vx is, for example, a voltage at which the gradation expression of the pixel PX becomes the maximum value. Suppose that the ratio between the luminance at the location of the first pixel PX1 and the luminance at the location of the second pixel PX2 in the luminance distribution in FIG. 5 is 4:10, then it is preferable that D1:D2=10:4. Thus, the difference in luminance between the locations of the pixels PX1 and PX2 is cancel out. Note that even if the luminance difference is not completely canceled out, the effect of improving the display quality can be obtained if the luminance difference is small.

Up to this point, two pixels PX1 and PX2 are focused, but it is preferable that the evaluation value of each of a plurality of pixels PX disposed between the first and second pixels PX1 and PX2 gradually increases as it becomes closer to the first pixel PX1 from the second pixel PX2.

Further, it is preferable that the evaluation value of each pixel PX contained in the display area DA gradually increase as the location approaches the second side surface SF2 from the first side surface SF1 side. As a result, the luminance gradient that gradually decreases as the location approaches the second side surface SF2 from the first side surface SF1 as shown in FIG. 5 is canceled as a whole, and the non-uniformity in luminance can be seamlessly suppressed over the entire display area DA. For example, the evaluation value of the pixel PX closest to the first side surface SF1 may be set to about 1.0, and the evaluation value of the pixel PX closest to the second side surface SF2 may be set to about 3.0.

The pixels PX aligned along the first direction X are at the same distance from the first side surface SF1 (or the distance from the light source LS). Therefore, for those pixels PX aligned along the first direction X, the evaluation values thereof may be the same as each other.

Note that when the evaluation value is 1.0, the movement of the liquid crystal molecules 31 is excessively suppressed by the polymers 30, and as a result, high responsiveness (response characteristics) to voltage may not be obtained. As a measure to this, the evaluation value of all pixels PX may be set to greater than 1.0 (for example, 1.1 or more).

Figure 14:
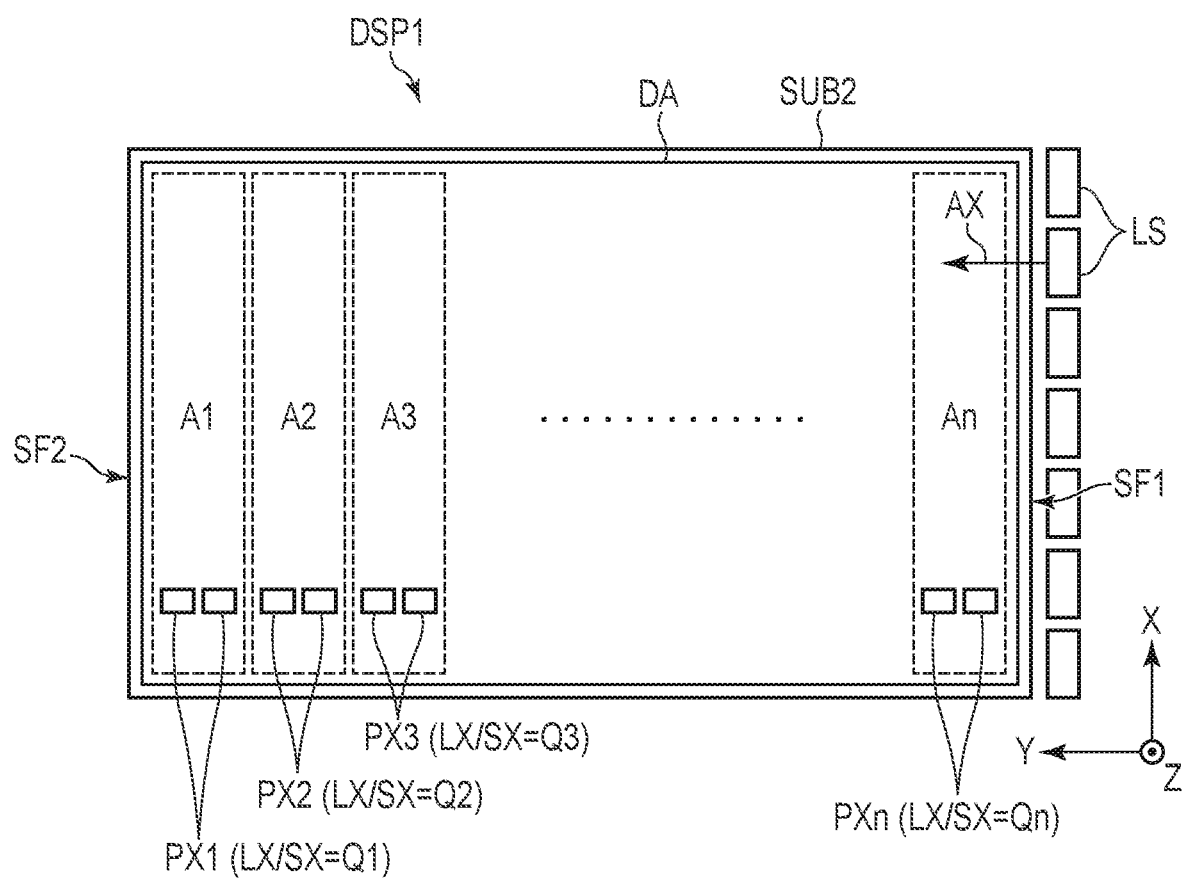
FIG. 14 shows another example of the pattern adjustment of the polymers in the first embodiment.

FIG. 14 shows another example of pattern adjustment of the polymers 30. In this example, the display area DA includes a first area A1 to a n-th area An (where n is an integer of 2 or more) that are aligned in order from the second side surface SF2 to the first side surface SF1.

The first area A1 contains a plurality of first pixels PX1 whose evaluation value is Q1. The second area A2 contains a plurality of second pixels PX2 whose evaluated value is Q2. Similarly, the third to n-th areas A3 to An each contain a plurality of pixels PX whose evaluation values are Q3 to Qn, respectively. In the first to n-th areas A1 to An, at least two pixels PX are aligned in the array direction (second direction Y) of the areas A1 to An.

In the evaluation values Q1 to Qn, the evaluation value Q1 is the largest and the evaluation value Qn is the smallest. The evaluation values Q2 to Qn-1 gradually become smaller from Q1 to Qn (Q1>Q2>Q3 . . . >Qn). Thus, even when the pattern of the polymers 30 is adjusted for each area containing a plurality of pixels PX, the luminance gradient that gradually decreases as the location is closer to the second side surface SF2 from the first side surface SF1 side as shown in FIG. 5 is canceled out, thereby making it possible to suppress the non-uniformity in luminance of the display area DA.

According to this embodiment described above, the display panel PNL comprises a plurality of types of pixels PX exhibiting different degrees of scattering when the same voltage is applied, the luminance gradient that may occur depending on the distance from the light sources LS can be relaxed, thereby obtaining excellent display quality.

Further, when the scattering degree of the pixels PX close to the light sources LS is lowered as in this embodiment, the light scattered by the pixels PX close to the light sources LS is reduced, thereby making it more easily for the light to reach those pixels PX located distant from the light sources LS. Therefore, the luminance gradient shown in FIG. 5 itself, can be expected to be relaxed.

In addition, various other advantageous effects can be obtained from this embodiment.

Second Embodiment

The second embodiment will now be described. Here, the differences from the first embodiment will be mainly focused, and explanations on a configuration similar to those of the first embodiment will be omitted.

Figure 15:
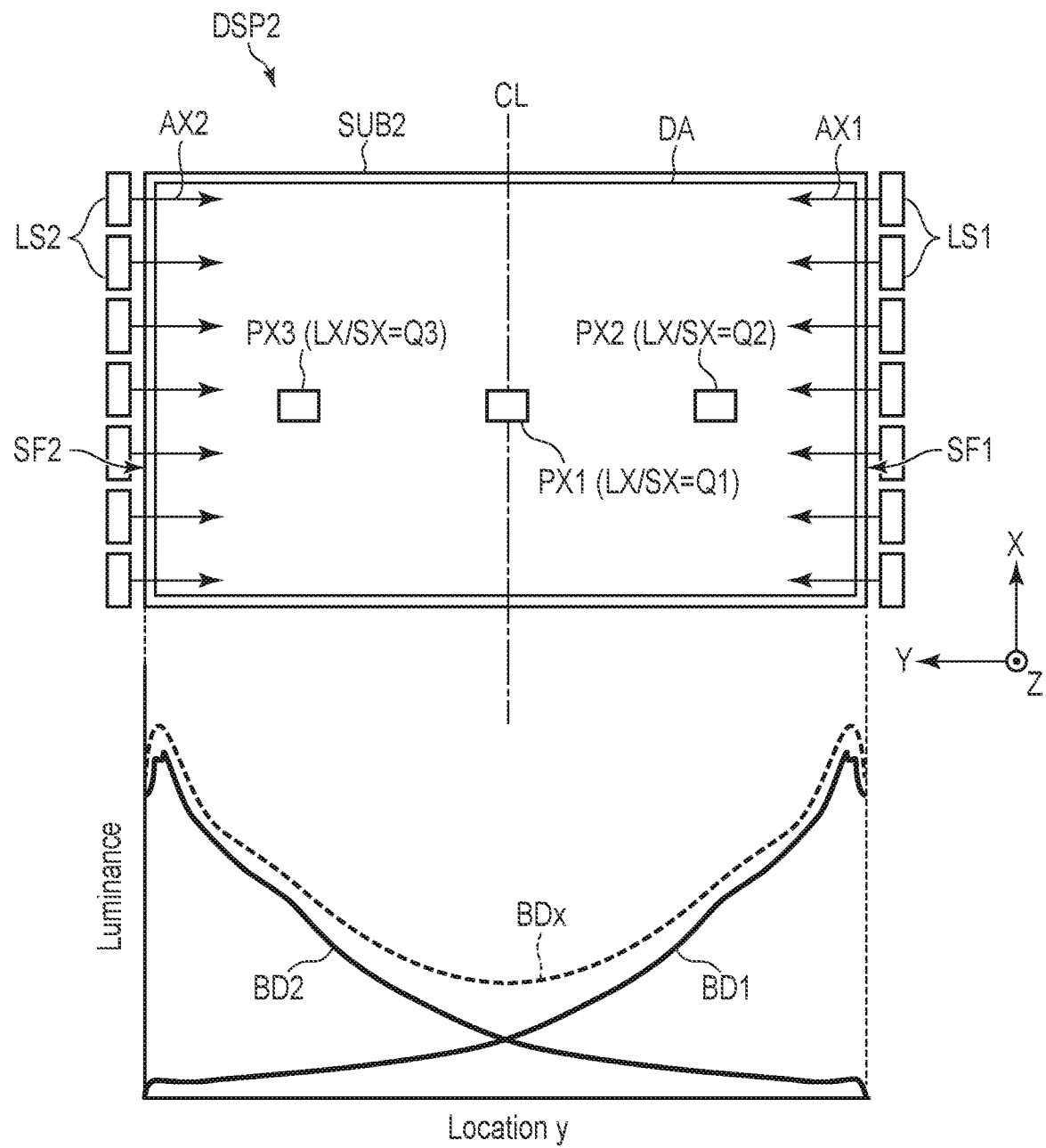
FIG. 15 is a diagram illustrating a configuration of the display device and an example of pattern adjustment of the polymers in the second embodiment.

FIG. 15 is a diagram illustrating a configuration of a display device DSP2 in the second embodiment. FIG. 15 includes an upper part which shows a schematic plan view of the second substrate SUB2 and the light sources LS, and a lower part which shows luminance distribution according to a location y in a second direction Y.

In this embodiment, the display device DSP2 comprises a plurality of first light sources LS1 and a plurality of second light sources LS2. The first light sources LS1 oppose a first side surface SF1 of the second substrate SUB2 and are arranged to be spaced apart from each other along the first direction X. The second light sources LS2 oppose a second side surface SF2 of a second substrate SUB2 and are arranged to be spaced apart from each other along the first direction X. The number of the first light sources LS1 and the number of the second light sources LS2 may be the same as or different from each other. Each of the light sources LS1 and LS2 may oppose a side surface of the first substrate SUB1, or side surfaces of both the first substrate SUB1 and the second substrate SUB2.

The first light sources LS1 irradiates light diffusing around the optical axis AX1 at its center onto the first side surface SF1. The second light source LS2 irradiates light diffusing around the optical axis AX2 at its center onto the second side surface SF2. The optical axes AX1 and AX2 are parallel to the second direction Y, for example. As in the case of the first embodiment, it is preferable that the direction in which the stringy polymers 30 extend and the directions of the optical axes AX1 and AX2 are orthogonal in a plan view. In this case, in the spatial frequency spectrum of the pattern of the polymers 30, the direction of a major axis LX will correspond to the directions of the optical axes AX1 and AX2.

The first light source LS1 and the second light source LS2 include, for example, a light-emitting element that emits red light, a light-emitting element that emits green light and a light-emitting element that emits blue light. As the light-emitting elements, for example, light-emitting diodes can be employed.

The luminance distribution BD1 in FIG. 15 corresponds to the case where the first light sources LS1 are on, whereas the second light sources LS2 are off and a predetermined scattering voltage is applied to the pixel electrodes PE of all the pixels PX. On the other hand, the luminance distribution BD2 corresponds to the case where the second light sources LS2 are on, whereas the first light sources LS1 are, and a predetermined scattering voltage is applied to the pixel electrodes PE of all the pixels PX.

The luminance distribution BDx corresponds to the case where the first light sources LS1 and the second light sources LS2 are all on and a predetermined scattering voltage is applied to the pixel electrodes PE of all the pixels PX. For example, the luminance distribution BDx is a total sum of the luminance distributions BD1 and BD2. In the example shown in FIG. 15, the total luminance is reduced at, for example, a center CL of the display area DA along the second direction Y. Note that the luminance distributions BD1, BD2 and BDx are comparative examples to this embodiment on the assumption that the shapes of the polymers 30 superimposed on the pixels PX are uniform.

The pixels PX arranged in the display area DA includes a first pixel PX1, a second pixel PX2 and a third pixel PX3. The first pixel PX1 is located, for example, at the center CL. The second pixel PX2 is located closer to the first side surface SF1 than to the first pixel PX1. The third pixel PX3 is located closer to the second side surface SF2 than to the first pixel PX1.

The evaluation value (LX/SX) of the polymers 30 superimposed on the first pixel PX1 is Q1, the evaluation value of the polymers 30 superimposed on the second pixel PX2 is Q2, and the evaluation value of the polymers 30 superimposed on the third pixel PX3 is Q3.

In order to cancel out the luminance distribution BDx, it suffices if the evaluation value Q1 is set greater than the evaluation values Q2 and Q3 (Q1>Q2, Q3). Specific values of the evaluation values Q1 to Q3 should preferably be determined so that the luminance values when a predetermined voltage is applied to the pixels PX1 to PX3 (for example, the voltage by which the gradation expression is at the maximum value) are equivalent to each other. However, even if the luminance difference is not completely canceled out, the effect of improving the display quality can be obtained as long as the luminance difference is narrowed.

It is preferable that the evaluation value of each of those pixels PX located between the first and second pixels PX1 and PX2 should gradually increase as the location thereof is closer to the first pixel PX1 from the second pixel PX2 side. Similarly, it is preferable that the evaluation value of each of those pixels PX located between the first and third pixels PX1 and PX3 should gradually increase as the location thereof is closer to the first pixel PX1 from the third pixel PX3 side.

From another point of view, it is preferable that the evaluation value of each of the pixels PX contained in the display area DA should gradually increase as the location thereof is closer to the center CL from first and second SF1 and SF2 sides, respectively. Thus, the luminance distribution BDx can be canceled out as a whole and the non-uniformity in luminance can be suppressed seamlessly over the entire display area DA. For example, the evaluation value of the pixel PX closest to each of the side surfaces SF1 and SF2 may be set to about 1.0, and the evaluation value of the pixel PX closest to the center CL may be set to about 3.0. As described in the first embodiment, the evaluation values of all the pixels PX may be set to be greater than 1.0 (for example, greater than or equal to 1.1).

Those pixels PX aligned along the first direction X are at the same distance from the first side surface SF1 and the second side surface SF2 (or from the light sources LS1 and LS2). Note that those pixels PX aligned along the first direction X may have the same evaluation value.

Figure 16:
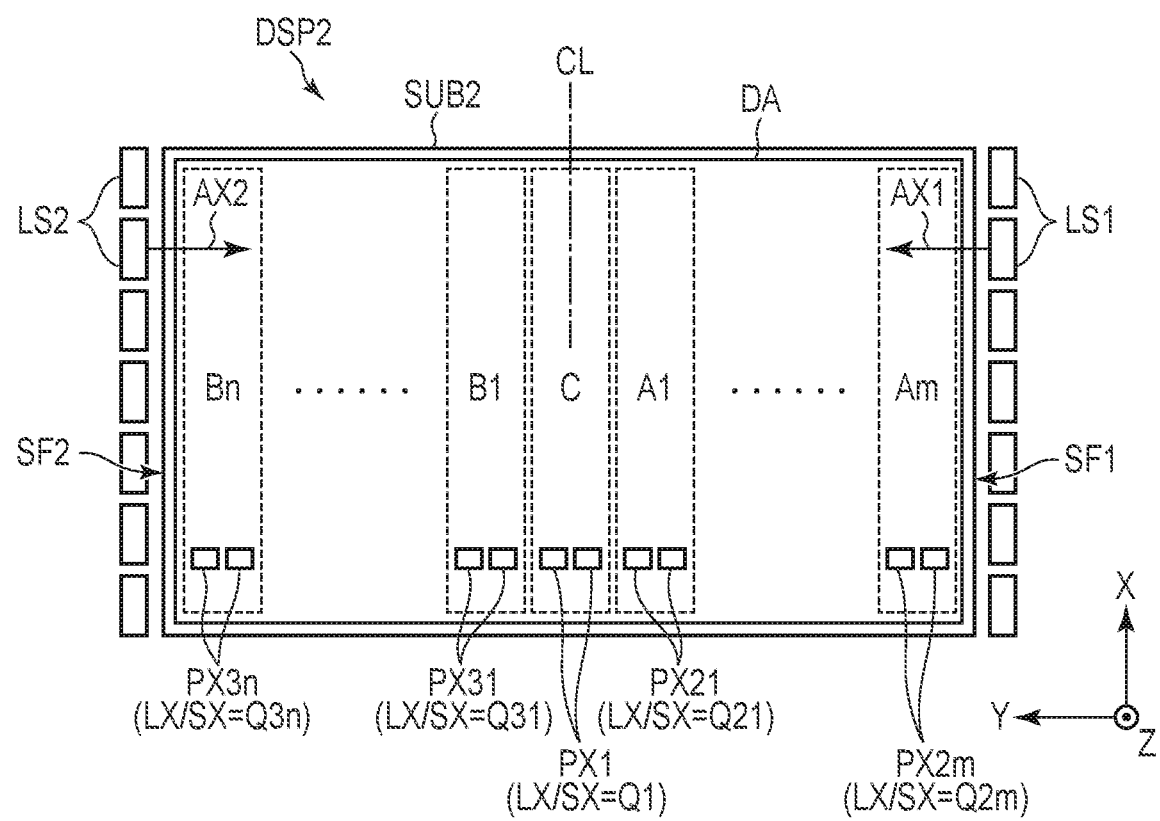
FIG. 16 shows another example of the pattern adjustment of the polymers in the second embodiment.

FIG. 16 is a diagram showing another example of pattern adjustment for the polymer 30. In this example, the display area DA includes a central area C overlapping the center CL, areas A1 to Am (m is an integer of two or more) aligned in order from the center CL toward the first side surface SF1, and areas B1 to Bn (n is an integer of two or more) aligned in order from the center CL toward the second side surface SF2.

The central area C contains a plurality of pixels PX1 whose evaluation value is Q1. The areas A1 to Am contain a plurality of pixels PX21 to PX2$m$ whose evaluation values are Q21 to Q2$m$, respectively. The areas B1 to Bn contain a plurality of pixels PX31 to PX3$n$ whose evaluation values are Q31 to Q3$n$, respectively. In the regions C, A1 to Am and B1 to Bn, at least two pixels PX are aligned along the direction of the arrangement of the areas C, A1 to Am and B1 to Bn (the second direction Y).

For example, in the evaluation values Q21 to Q2$m$, the value gradually decreases from Q21 to Q2$m$ (Q21>Q22>Q23 . . . >Q2$m$). Further, in the evaluation values Q31 to Q3$n$, the value gradually decreases from Q31 to Q3$n$ (Q31>Q32>Q33 . . . >Q3$n$). Furthermore, the evaluation value Q1 is greater than the evaluation values Q21 and Q31 (Q1>Q21, Q31).

As described above, even when the pattern of the polymers 30 is adjusted for each area containing multiple pixels PX, the luminance distribution BDx shown in FIG. 15 is canceled out, and thus the non-uniformity in luminance in the display area DA can be suppressed.

According to this embodiment described above, in the display device DSP2 in which the light sources LS1 and LS2 are disposed along the two side surfaces SF1 and SF2, the luminance gradient, which may occur according to the distance from the light sources LS1 and LS2 can be relaxed, and thus an excellent display quality can be obtained. Apart from this, this embodiment exhibits effects similar to those of the first embodiment.

Based on the display device which has been described in the above-described embodiments, a person having ordinary skill in the art may achieve a display device with an arbitral design change; however, as long as they fall within the scope and spirit of the present invention, such a display device is encompassed by the scope of the present invention.

A skilled person would conceive various changes and modifications of the present invention within the scope of the technical concept of the invention, and naturally, such changes and modifications are encompassed by the scope of the present invention. For example, if a skilled person adds/deletes/alters a structural element or design to/from/in the above-described embodiments, or adds/deletes/alters a step or a condition to/from/in the above-described embodiment, as long as they fall within the scope and spirit of the present invention, such addition, deletion, and altercation are encompassed by the scope of the present invention.

Furthermore, regarding the present embodiments, any advantage and effect those will be obvious from the description of the specification or arbitrarily conceived by a skilled person are naturally considered achievable by the present invention.

The followings are examples of the display device, which can be obtained from the present embodiments.

[1] A display device comprising:
a first substrate;
a second substrate opposing the first substrate;
a liquid crystal layer disposed between the first substrate and the second substrate and containing stringy polymers and liquid crystal molecules;
a display area including a plurality of pixels; and
a light source that irradiates light onto a side surface of the first substrate or the second substrate,
wherein
the plurality of pixels include a first pixel and a second pixel closer to the side surface than the first pixel, and
in a spatial frequency spectrum obtained by performing a two-dimensional Fourier transformation on a pattern of the stringy polymers which overlap the pixels in a plan view with respect to a first frequency component and a second frequency component, when an outline in a plane defined by the first frequency component and the second frequency component in an area having a value of 75% or more of the maximum value in the spectrum is defined as an evaluation circle, and a value obtained by dividing a length of a major axis of the evaluation circle by a length of a minor axis of the evaluation circle is defined as an evaluation value, the evaluation value of the stringy polymers overlapping the first pixel is greater than the evaluation value of the stringy polymers overlapping the second pixel.

[2] The display device of the item [1] above, further comprising:
a plurality of pixel electrodes disposed respectively in the plurality of pixels; and
a common electrode opposing the plurality of pixel electrodes,
wherein
the liquid crystal layer switches between a scattered state, in which light from the light source is scattered, and a transparent state, according to a voltage between the pixel electrodes and the common electrode.

[3] The display device of the item [1] above, wherein the evaluation value of each one of the plurality of pixels disposed between the first pixel and the second pixel gradually increases as a location thereof becomes closer to the first pixel, from the second pixel.

[4] The display device of the item [1] above, wherein the display area includes a first area and a second area located between the first area and the side surface,
the first area includes a plurality of first pixels including the first pixel, aligned along an arrangement direction of the first area and second area, and
the second area includes a plurality of second pixels including the second pixel, aligned along the arrangement direction.

[5] The display device of the item [1] above, wherein a direction of the major axis corresponds to a direction of an optical axis of the light irradiated by the light source.

[6] The display device of the item [1] above, wherein the first substrate comprises a first alignment film in contact with the liquid crystal layer,
the second substrate comprises a second alignment film in contact with the liquid crystal layer, and
directions in which alignment restriction forces of the first alignment film and the second alignment film act are orthogonal to an optical axis of the light irradiated by the light source.

[7] The display device of the item [1] above, wherein the evaluation values of the stringy polymers overlapping respectively the plurality of pixels aligned along the direction orthogonal to an optical axis of the light irradiated by the light source are the same as each other.

[8] The display device of the item [1] above, wherein the evaluation value of the stringy polymers overlapping the first pixel and the evaluation value of the stringy polymers overlapping the second pixel are both 1.1 or greater.

[9] The display device of the item [1] above, wherein a background of the first substrate is visible through the first substrate and the second substrate, and a background of the second substrate is visible through the first substrate and the second substrate.

[10] The display device of the item [1] above, wherein the first substrate comprises at least one of a UV absorption layer or an anti-reflective layer provided on a surface on a side not opposing the second substrate.

[11] A display device comprising:
a first substrate;
a second substrate opposing the first substrate;
a liquid crystal layer disposed between the first substrate and the second substrate and containing stringy polymers and liquid crystal molecules;
a display area including a plurality of pixels;
a first light source that irradiates light onto a first side surface of the first substrate or the second substrate; and
a second light source that irradiates light onto a second side surface of the first substrate or the second substrate, which is opposite to the first side surface,
wherein
the plurality of pixels include a first pixel, a second pixel closer to the first side surface than the first pixel and a third pixel closer to the second side surface than the first pixel, and in a spatial frequency spectrum obtained by performing a two-dimensional Fourier transformation on a pattern of the stringy polymers which overlap the pixels in a plan view with respect to a first frequency component and a second frequency component, when an outline in a plane defined by the first frequency component and the second frequency component in an area having a value of 75% or more of the maximum value in the spectrum is defined as an evaluation circle, and a value obtained by dividing a length of a major axis of the evaluation circle by a length of a minor axis of the evaluation circle is defined as an evaluation value, the evaluation value of the stringy polymers overlapping the first pixel is greater than the evaluation values of the stringy polymers overlapping the second pixel and the third pixel.

[12] The display device of the item [11] above, further comprising:

a plurality of pixel electrodes disposed respectively in the plurality of pixels; and a common electrode opposing the plurality of pixel electrodes, wherein the liquid crystal layer switches between a scattered state, in which light from the first light source and the second light source is scattered, and a transparent state, according to a voltage between the pixel electrodes and the common electrode.

[13] The display device of the item [11] above, wherein the evaluation value of each one the plurality of pixels disposed between the first pixel and the second pixel gradually increases as a location thereof becomes closer to the first pixel, from the second pixel, and the evaluation value of each one the plurality of pixels disposed between the first pixel and the third pixel gradually increases as a location thereof becomes closer to the first pixel, from the third pixel.

[14] The display device of the item [11] above, wherein the display area includes a first area, a second area located between the first area and the first side surface and a third area located between the first area and the second side surface, the first area includes a plurality of first pixels including the first pixel, aligned along an arrangement direction of the first area, the second area and the third area, the second area includes a plurality of second pixels including the second pixel, aligned along the arrangement direction, and the third region includes a plurality of third pixels including the third pixel, aligned along the arrangement direction.

[15] The display device of the item [11] above, wherein a direction of the major axis corresponds to a direction of an optical axis of the light irradiated by the first light source or the second light source.

[16] The display device of the item [11] above, wherein the first substrate comprises a first alignment film in contact with the liquid crystal layer, the second substrate comprises a second alignment film in contact with the liquid crystal layer, and directions in which alignment restriction forces of the first alignment film and the second alignment film act are orthogonal to an optical axis of the light irradiated by the first light source or the second light source.

[17] The display device of the item [11] above, wherein the evaluation values of the stringy polymers overlapping respectively the plurality of pixels aligned along the direction orthogonal to an optical axis of the light irradiated by the first light source or the second light source are the same as each other.

[18] The display device of the item [11] above, wherein the evaluation value of the stringy polymers overlapping the first pixel and the evaluation value of the stringy polymers overlapping the second pixel are both 1.1 or greater.

[19] The display device of the item [11] above, wherein a background of the first substrate is visible through the first substrate and the second substrate, and a background of the second substrate is visible through the first substrate and the second substrate.

[20] The display device of the item [11] above, wherein the first substrate comprises at least one of a UV absorption layer or an anti-reflective layer provided on a surface on a side not opposing the second substrate.

What is claimed is:

1. A display device comprising:

a first substrate;

a second substrate opposing the first substrate;

a liquid crystal layer disposed between the first substrate and the second substrate and containing stringy polymers and liquid crystal molecules;

a display area including a plurality of pixels; and a light source that irradiates light onto a side surface of the first substrate or the second substrate, wherein the plurality of pixels include a first pixel and a second pixel closer to the side surface than the first pixel, and in a spatial frequency spectrum obtained by performing a two-dimensional Fourier transformation on a pattern of the stringy polymers which overlap the pixels in a plan view with respect to a first frequency component and a second frequency component, when an outline in a plane defined by the first frequency component and the second frequency component in an area having a value of 75% or more of the maximum value in the spectrum is defined as an evaluation circle, and a value obtained by dividing a length of a major axis of the evaluation circle by a length of a minor axis of the evaluation circle is defined as an evaluation value, the evaluation value of the stringy polymers overlapping the first pixel is greater than the evaluation value of the stringy polymers overlapping the second pixel.

2. The display device of claim 1, further comprising:

a plurality of pixel electrodes disposed respectively in the plurality of pixels; and a common electrode opposing the plurality of pixel electrodes, wherein the liquid crystal layer switches between a scattered state, in which light from the light source is scattered, and a transparent state, according to a voltage between the pixel electrodes and the common electrode.

3. The display device of claim 1, wherein the evaluation value of each one of the plurality of pixels disposed between the first pixel and the second pixel gradually increases as a location thereof becomes closer to the first pixel, from the second pixel.

4. The display device of claim 1, wherein the display area includes a first area and a second area located between the first area and the side surface, the first area includes a plurality of first pixels including the first pixel, aligned along an arrangement direction of the first area and second area, and the second area includes a plurality of second pixels including the second pixel, aligned along the arrangement direction.

5. The display device of claim 1, wherein
a direction of the major axis corresponds to a direction of an optical axis of the light irradiated by the light source.

6. The display device of claim 1, wherein
the first substrate comprises a first alignment film in contact with the liquid crystal layer,
the second substrate comprises a second alignment film in contact with the liquid crystal layer, and
directions in which alignment restriction forces of the first alignment film and the second alignment film act are orthogonal to an optical axis of the light irradiated by the light source.

7. The display device of claim 1, wherein
the evaluation values of the stringy polymers overlapping respectively the plurality of pixels aligned along the direction orthogonal to an optical axis of the light irradiated by the light source are the same as each other.

8. The display device of claim 1, wherein
the evaluation value of the stringy polymers overlapping the first pixel and the evaluation value of the stringy polymers overlapping the second pixel are both 1.1 or greater.

9. The display device of claim 1, wherein
a background of the first substrate is visible through the first substrate and the second substrate, and a background of the second substrate is visible through the first substrate and the second substrate.

10. The display device of claim 1, wherein
the first substrate comprises at least one of a UV absorption layer or an anti-reflective layer provided on a surface on a side not opposing the second substrate.

11. A display device comprising:
a first substrate;
a second substrate opposing the first substrate;
a liquid crystal layer disposed between the first substrate and the second substrate and containing stringy polymers and liquid crystal molecules;
a display area including a plurality of pixels;
a first light source that irradiates light onto a first side surface of the first substrate or the second substrate; and
a second light source that irradiates light onto a second side surface of the first substrate or the second substrate, which is opposite to the first side surface,
wherein the plurality of pixels include a first pixel, a second pixel closer to the first side surface than the first pixel and a third pixel closer to the second side surface than the first pixel, and
in a spatial frequency spectrum obtained by performing a two-dimensional Fourier transformation on a pattern of the stringy polymers which overlap the pixels in a plan view with respect to a first frequency component and a second frequency component, when an outline in a plane defined by the first frequency component and the second frequency component in an area having a value of 75% or more of the maximum value in the spectrum is defined as an evaluation circle, and a value obtained by dividing a length of a major axis of the evaluation circle by a length of a minor axis of the evaluation circle is defined as an evaluation value, the evaluation value of the stringy polymers overlapping the first pixel is greater than the evaluation values of the stringy polymers overlapping the second pixel and the third pixel.

12. The display device of claim 11, further comprising:
a plurality of pixel electrodes disposed respectively in the plurality of pixels; and
a common electrode opposing the plurality of pixel electrodes,
wherein
the liquid crystal layer switches between a scattered state, in which light from the first light source and the second light source is scattered, and a transparent state, according to a voltage between the pixel electrodes and the common electrode.

13. The display device of claim 11, wherein
the evaluation value of each one the plurality of pixels disposed between the first pixel and the second pixel gradually increases as a location thereof becomes closer to the first pixel, from the second pixel, and
the evaluation value of each one the plurality of pixels disposed between the first pixel and the third pixel gradually increases as a location thereof becomes closer to the first pixel, from the third pixel.

14. The display device of claim 11, wherein
the display area includes a first area, a second area located between the first area and the first side surface and a third area located between the first area and the second side surface,
the first area includes a plurality of first pixels including the first pixel, aligned along an arrangement direction of the first area, the second area and the third area,
the second area includes a plurality of second pixels including the second pixel, aligned along the arrangement direction, and
the third region includes a plurality of third pixels including the third pixel, aligned along the arrangement direction.

15. The display device of claim 11, wherein
a direction of the major axis corresponds to a direction of an optical axis of the light irradiated by the first light source or the second light source.

16. The display device of claim 11, wherein
the first substrate comprises a first alignment film in contact with the liquid crystal layer,
the second substrate comprises a second alignment film in contact with the liquid crystal layer, and
directions in which alignment restriction forces of the first alignment film and the second alignment film act are orthogonal to an optical axis of the light irradiated by the first light source or the second light source.

17. The display device of claim 11, wherein
the evaluation values of the stringy polymers overlapping respectively the plurality of pixels aligned along the direction orthogonal to an optical axis of the light irradiated by the first light source or the second light source are the same as each other.

18. The display device of claim 11, wherein
the evaluation value of the stringy polymers overlapping the first pixel and the evaluation value of the stringy polymers overlapping the second pixel are both 1.1 or greater.

19. The display device of claim 11, wherein
a background of the first substrate is visible through the first substrate and the second substrate, and a background of the second substrate is visible through the first substrate and the second substrate.

20. The display device of claim 11, wherein
the first substrate comprises at least one of a UV absorption layer or an anti-reflective layer provided on a surface on a side not opposing the second substrate.

* * * * *